G. B. REISBACH.
CUTTING AND SEALING MACHINE.
APPLICATION FILED APR. 10, 1914.
1,220,556.
Patented Mar. 27, 1917.
10 SHEETS—SHEET 7.
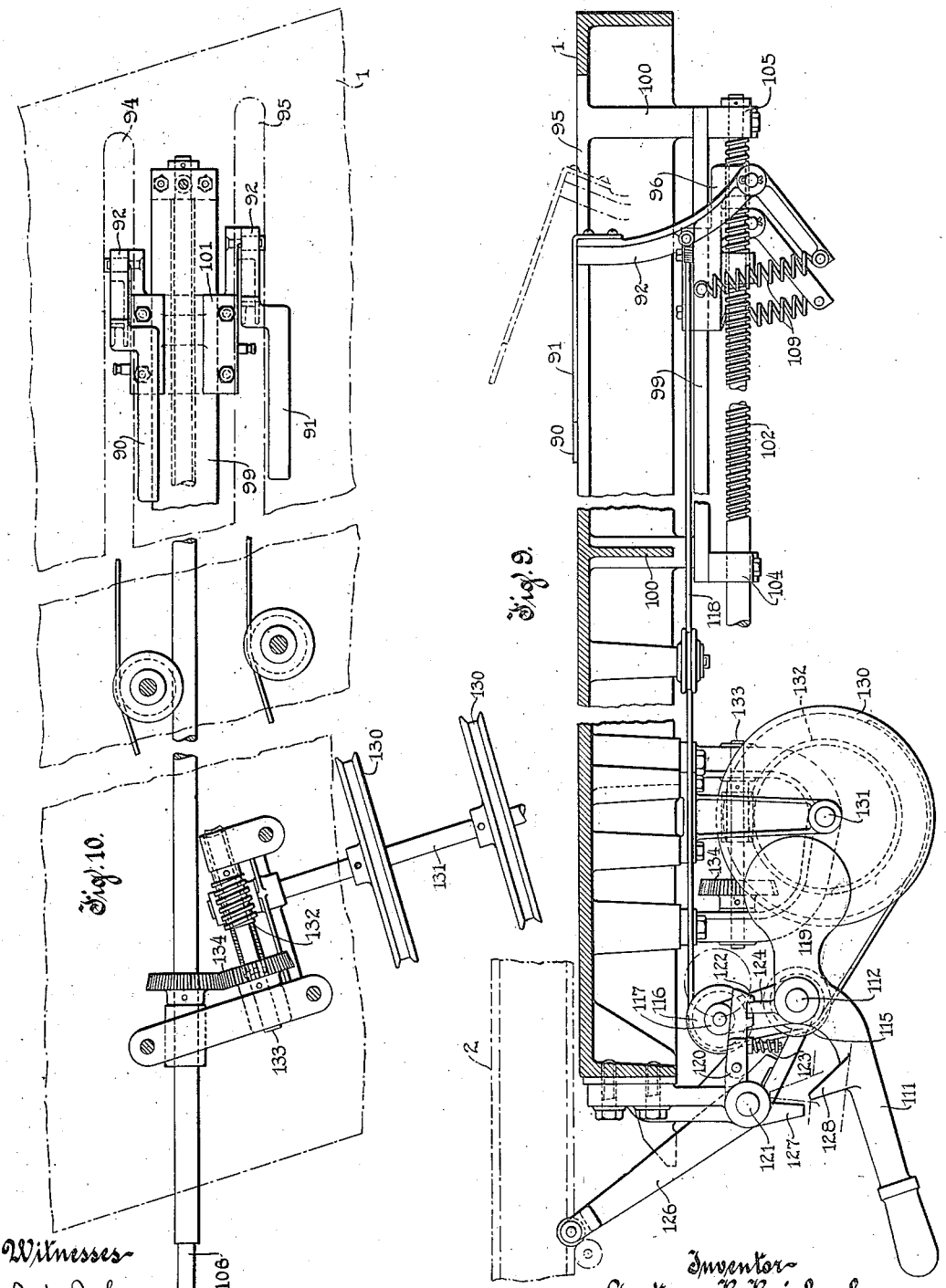

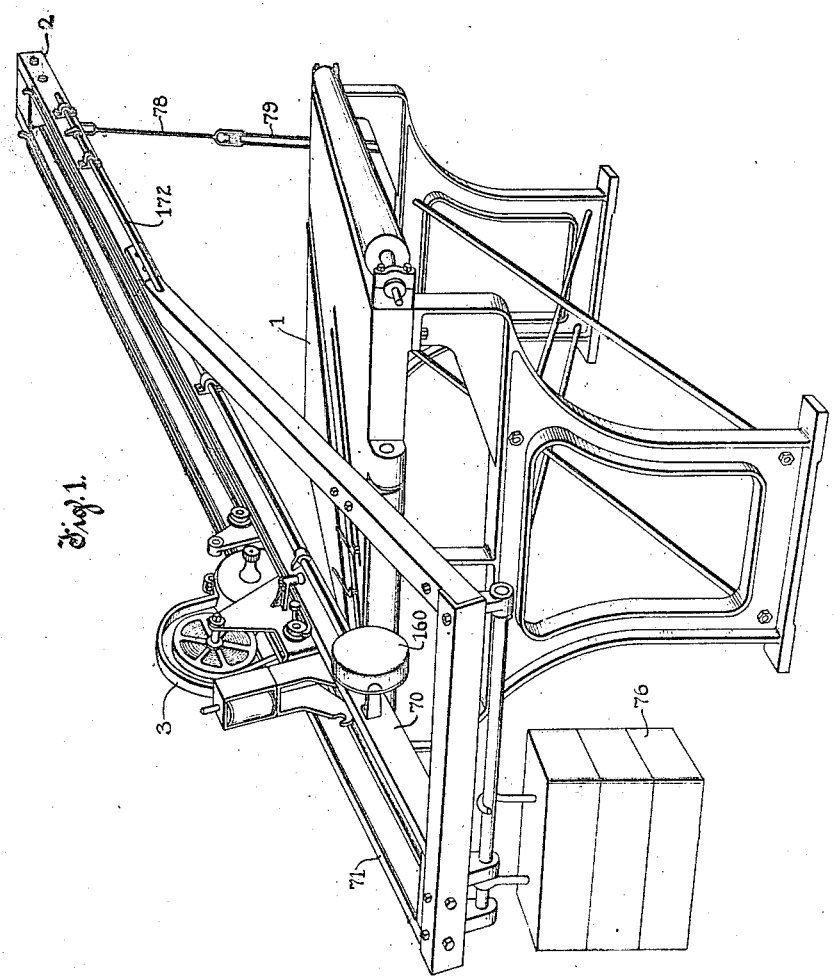

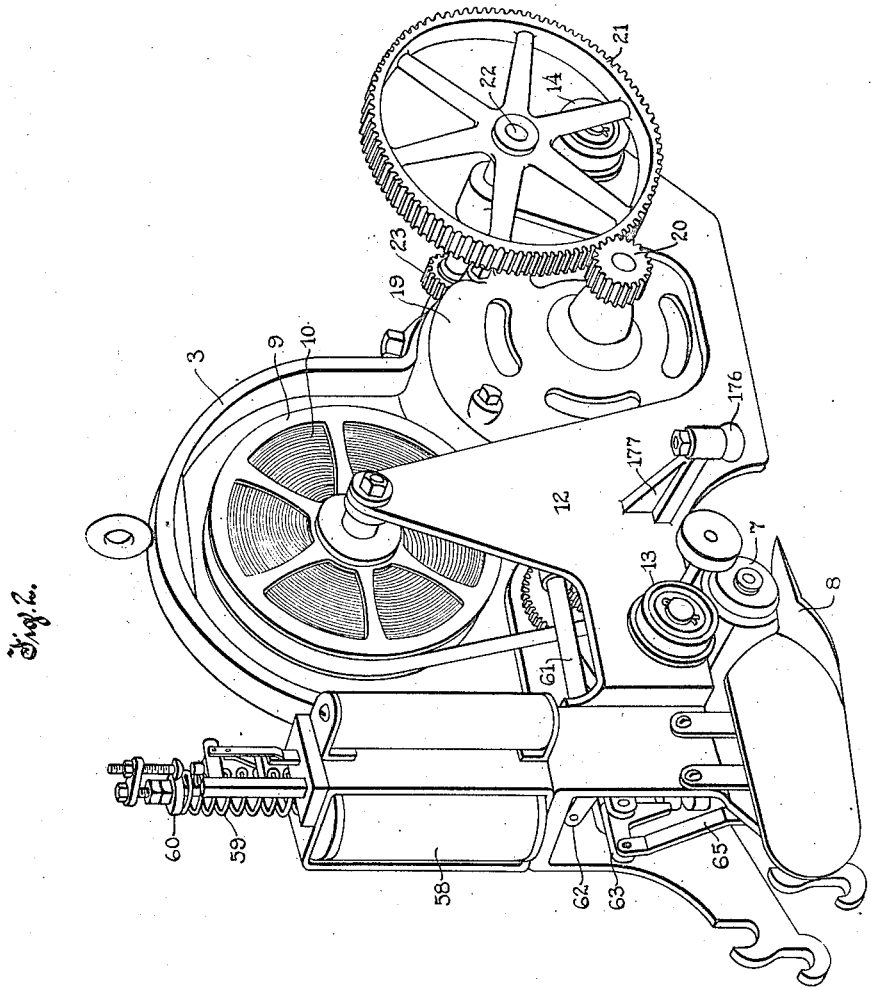

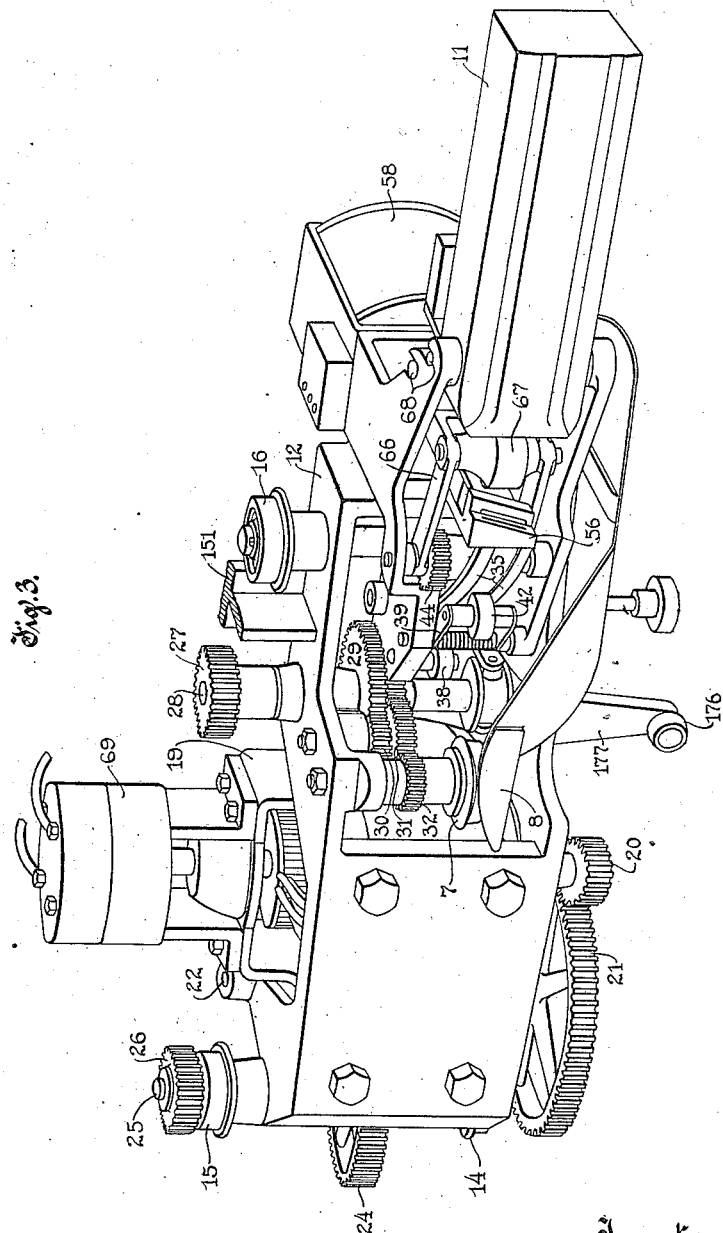

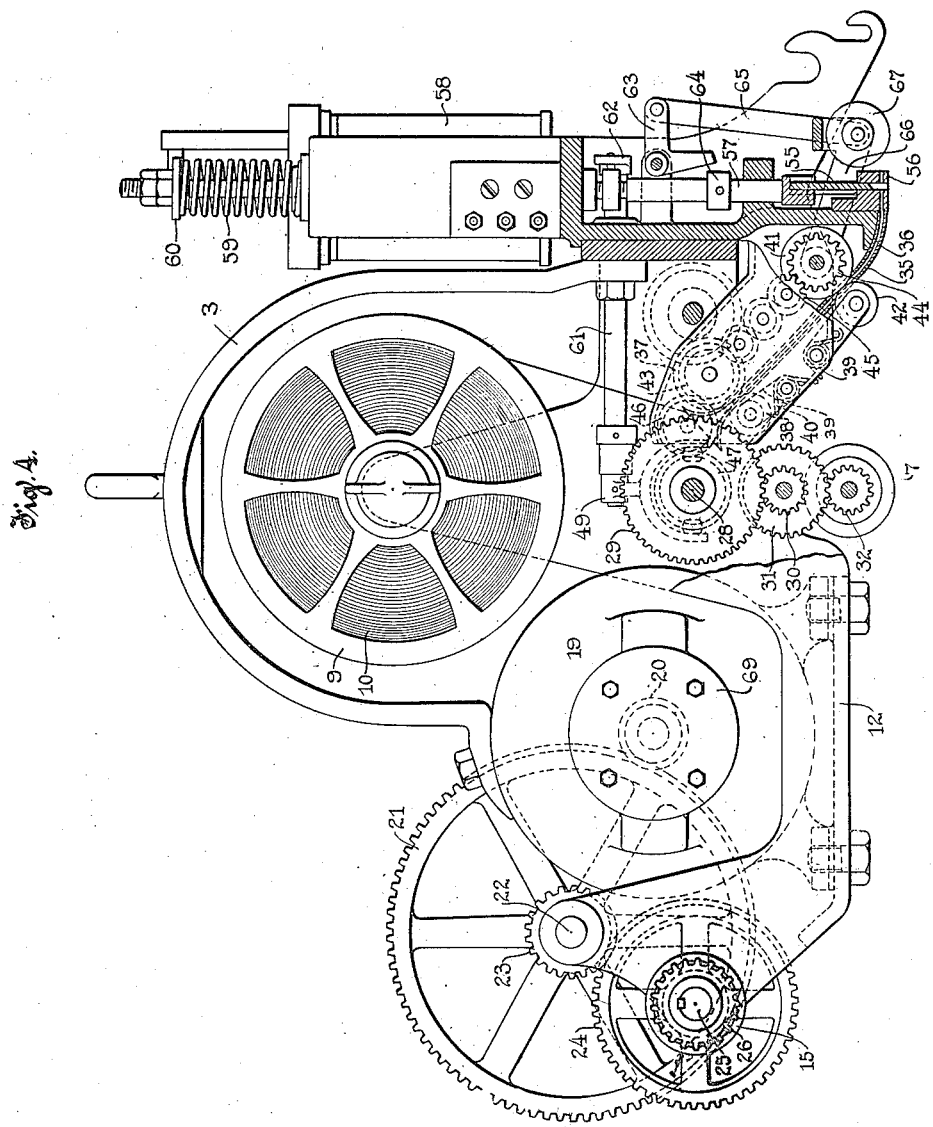

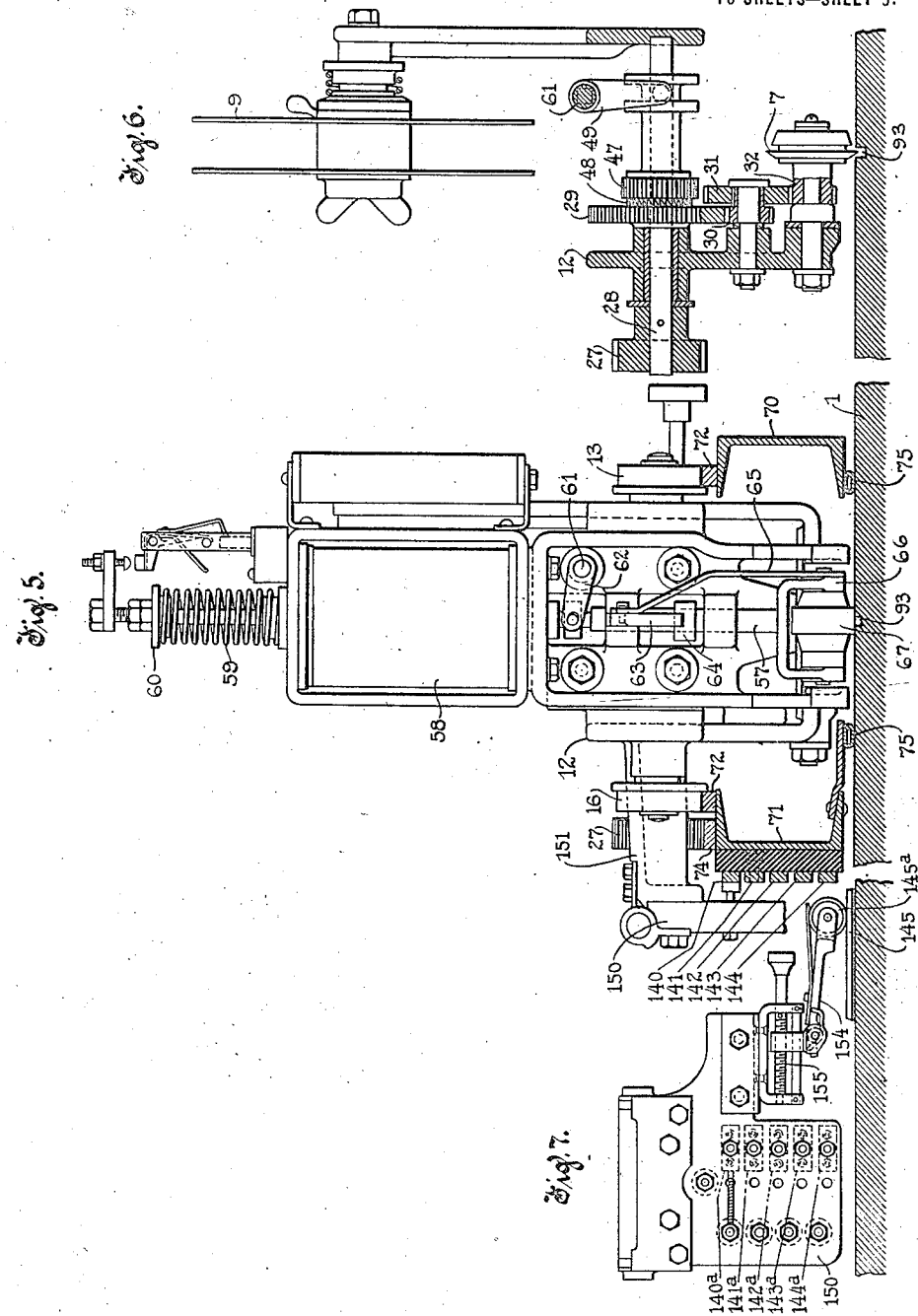

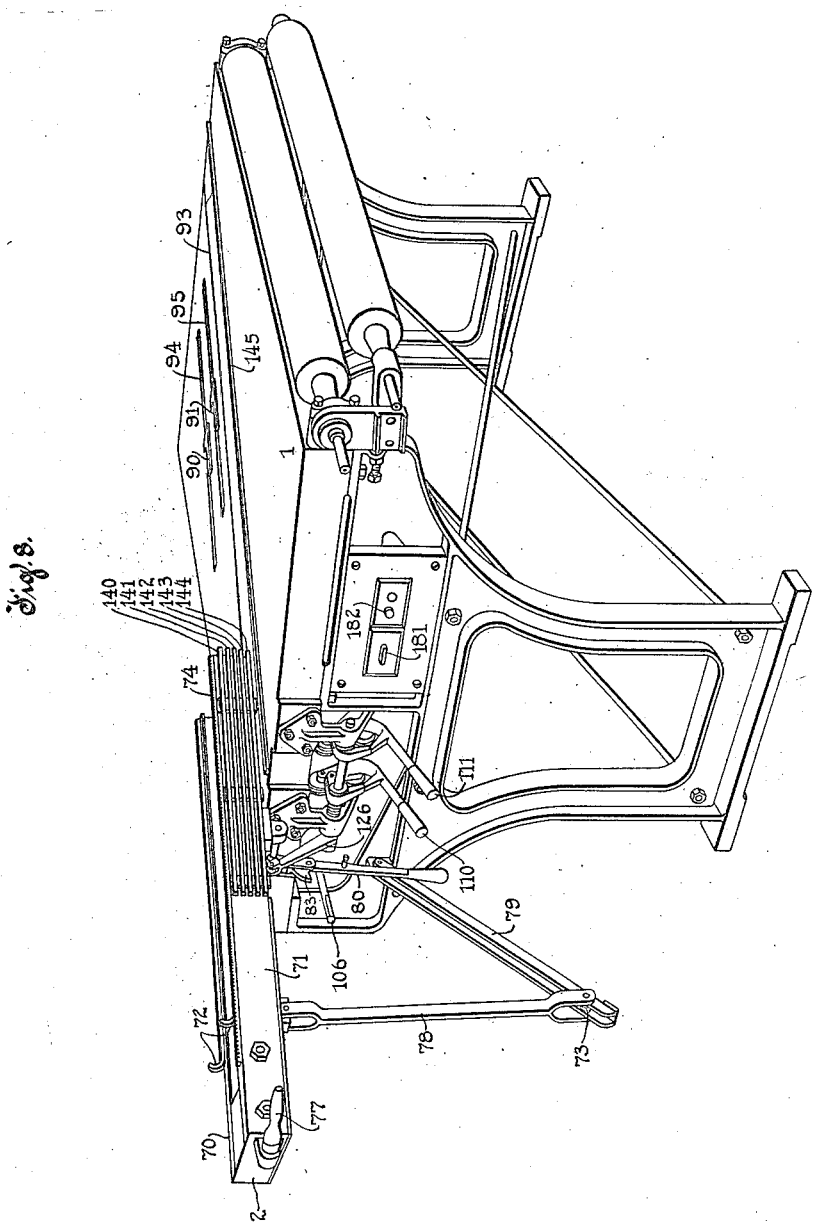

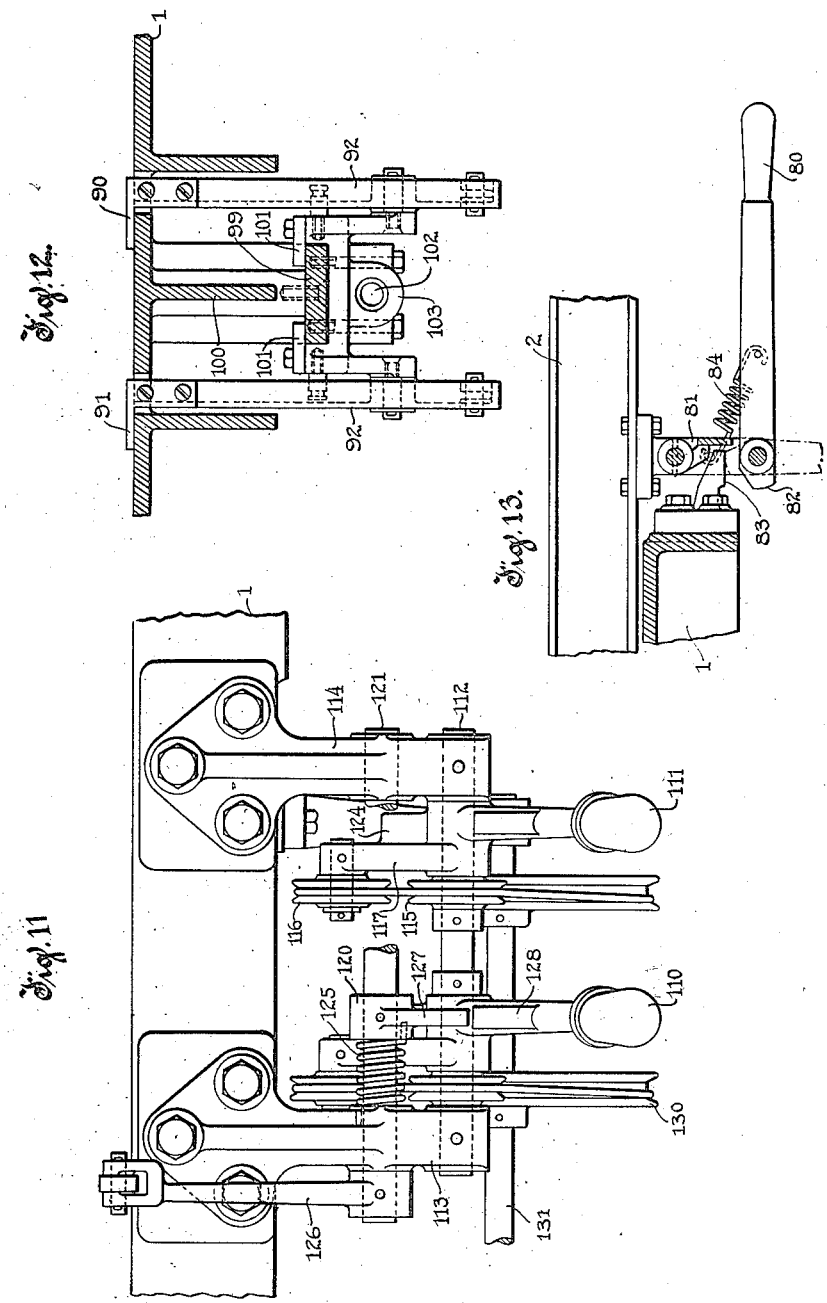

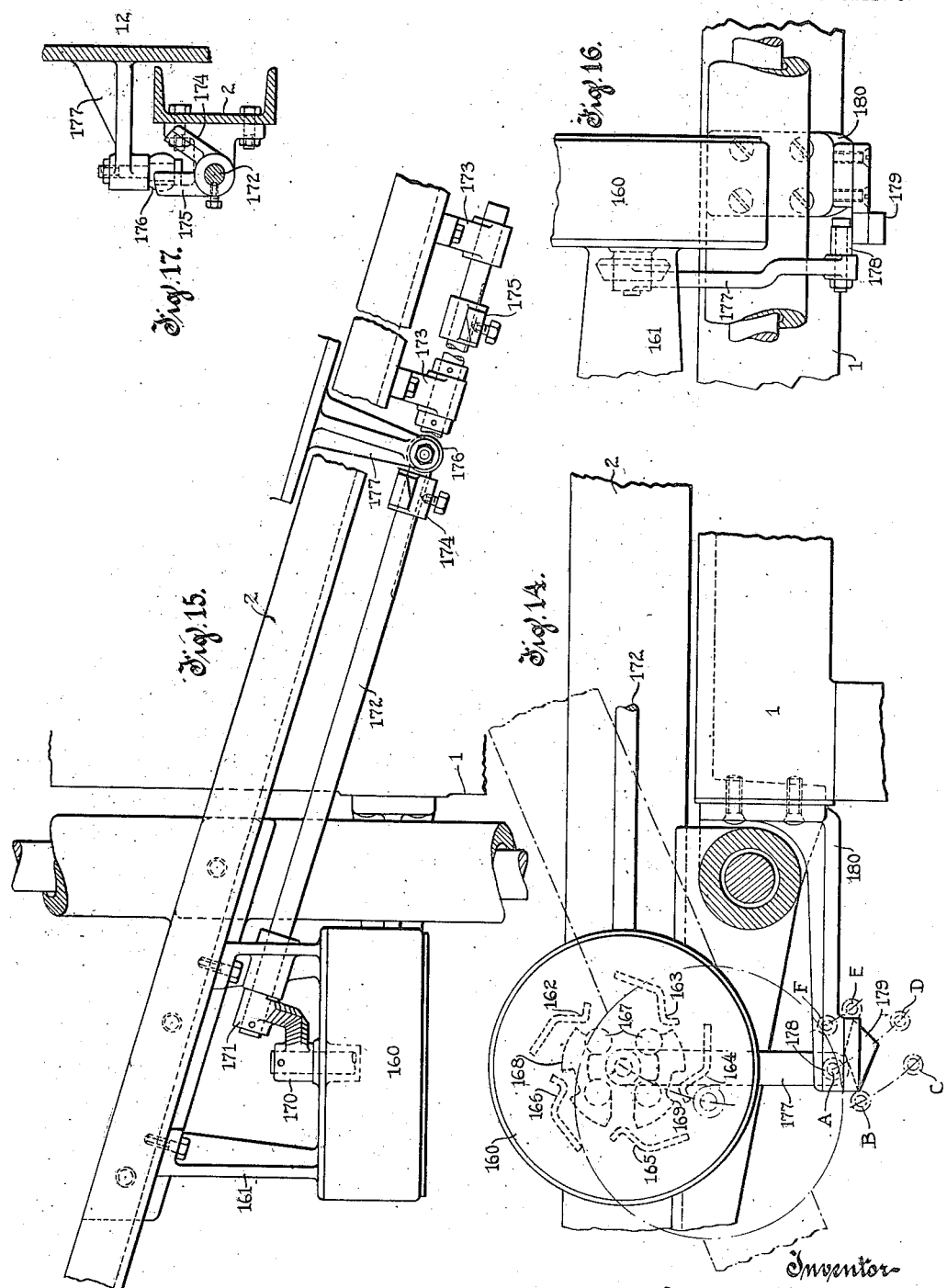

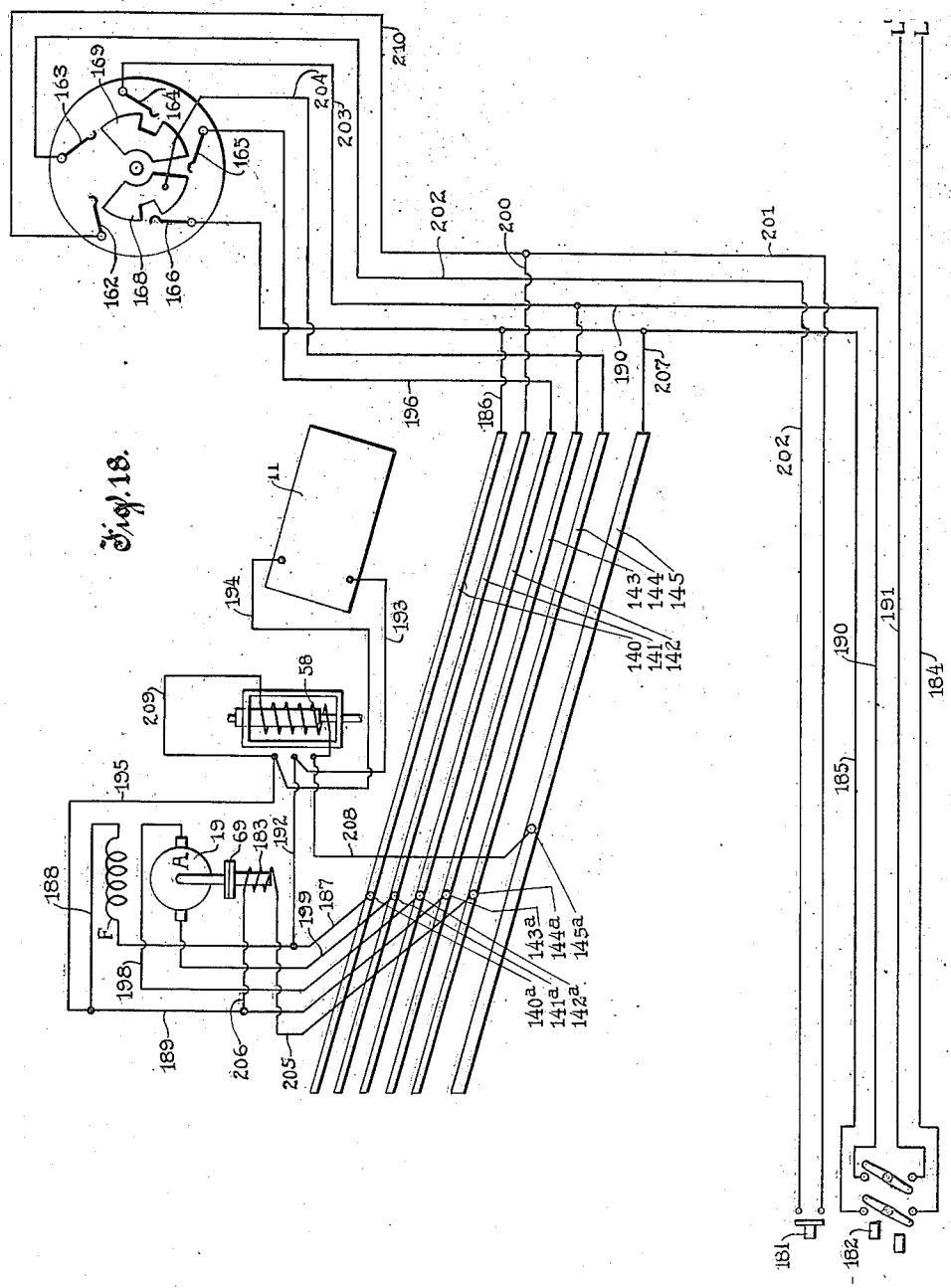

UNITED STATES PATENT OFFICE.

GUSTAVE B. REISBACH, OF MILWAUKEE, WISCONSIN, ASSIGNOR TO THE CUTLER-HAMMER MFG. CO., OF MILWAUKEE, WISCONSIN, A CORPORATION OF WISCONSIN.

CUTTING AND SEALING MACHINE.

1,220,556.  Specification of Letters Patent.  Patented Mar. 27, 1917.

Application filed April 10, 1914. Serial No. 831,063.

*To all whom it may concern:*

Be it known that I, GUSTAVE B. REISBACH, a citizen of the United States, residing at Milwaukee, in the county of Milwaukee and State of Wisconsin, have invented new and useful Improvements in Cutting and Sealing Machines, of which the following is a full, clear, concise, and exact description, reference being had to the accompanying drawing, forming a part of this specification.

This invention relates to machines for use in uniting printing press webs and other materials.

The various features of the invention although not limited thereto are particularly applicable to machines of the character disclosed in an application of Glenn S. Williamson, Serial No. 829571, filed April 4, 1914.

The objects and advantages of the invention will be apparent from the embodiment thereof illustrated in the accompanying drawings now to be described.

In the drawings,

Figure 1 is a general perspective view of the machine with various details thereof omitted;

Fig. 2 is a perspective view of the traveling device of the machine;

Fig. 3 is another perspective view of the same device;

Fig. 4 is a side elevation of the traveling device with certain parts thereof shown in section;

Figs. 5, 6 and 7 are detail views of the same device showing also certain other parts of the machine of Fig. 1;

Fig. 8 is a perspective view of the table and a portion of the movable frame shown in Fig. 1;

Figs. 9, 10, 11 and 12 are detail views of the aforesaid table;

Figs. 13, 14, 15, 16 and 17 are detail views of the aforesaid frame and control mechanism associated therewith; and, Fig. 18 is a diagrammatic view of the electrical parts of the machine and the preferred control circuits therefor.

Referring more specifically to Fig. 1, the machine as shown therein is of the same general character as that disclosed in the Williamson application, aforesaid, but provided with numerous additional features hereinafter described. In brief, the machine includes a work supporting table 1, a movable frame 2 extending across said table, and a traveling device 3 mounted on said frame to travel longitudinally thereof. The frame is pivoted to said table to be raised and lowered with respect thereto and when lowered to serve as a work clamp. The device 3 carries means adapted during its movement in one direction to automatically cut and seal together the webs or other material arranged on the work table 1. After the cutting and sealing operation the frame 2 is raised and the device 3 restored to initial position.

The mechanism as shown is particularly adapted for use in carrying out the method disclosed in the Williamson application, aforesaid. Briefly described, this method consists in overlapping the ends of the two pieces of material to be united, then severing the same on a common line, then removing the waste end of the upper piece of material and finally applying a sealing strip to overlap and adhere to both pieces of material and thereby unite the same.

In addition to the foregoing, Fig. 1 also shows certain other features hereinafter described.

Traveling device.

This device, as above stated, performs the cutting and sealing operations and will therefore be first described. Referring to Figs. 2, 3 and 4, this device is provided on its underside with a rotary cutter 7, a waste displacing plow 8, and on its upper side with a reel 9 carrying a roll of sealing strip 10 and at its rear with a pressure device 11 (Fig. 3) for applying said strip to the material to be united. It is also provided between the reel 9 and the pressure device 11 with a feeding and cutting mechanism for the sealing strip, hereinafter more fully described. All of these elements are mounted upon a suitable unitary frame 12 having supporting rollers 13 and 14 (Fig. 2) and 15 and 16 (Fig. 3) adapted to travel on suitable tracks on the frame 2. The movable frame 12 is adapted to be automatically propelled by an electric motor 19 also mounted thereon as shown in Figs. 2 and 4.

The propulsion of the traveling device is effected as follows, reference being made to Figs. 3 and 4: The motor is provided on its armature shaft with a pinion 20 connected through a gear 21 to a shaft 22 having fixed thereto a pinion 23 meshing with and driving a gear 24 fixed to a shaft 25 carrying the rollers 14 and 15. The shaft 25 also has fixed thereto a pinion 26 adapted to mesh with a stationary rack, hereinafter described, and thus provides for positive propulsion of the device at the desired speed. The movement of the traveling device in turn effects positive operation of the rotary cutter 7 and also of the feeding mechanism for the sealing strip.

The cutter 7 is operated by means best illustrated in Figs. 3, 4 and 6. This means includes a pinion 27 adapted to mesh with the same stationary rack as the pinion 26 and to drive a shaft 28 carrying a gear 29 meshing with a pinion 30 fixed to a larger gear 31, which, in turn, meshes with a pinion 32 fixed to the rotary cutter. This provides for a positive drive of the cutter at a relatively high speed upon movement of the traveling device relative to said stationary rack.

The feeding mechanism above mentioned is best illustrated in Fig. 4. It includes a guide comprising two parallel inclined plates 35 and 36 extending downwardly from a point adjacent to the reel 9 to a point contiguous with the pressure device 11. This guide is recessed adjacent to its upper end to receive a set of contacting rolls 37 and 38. The roll 37 is fixed while the roll 38 is mounted in a pivoted frame 39 and pressed by means of a spring 40 against the roll 37. The guide is also recessed contiguous to its delivery end to receive another pair of contacting rolls 41 and 42, similar to the rolls 37 and 38 respectively. The rolls 37 and 38 grip the sealing strip as it is inserted in the guide and feed the same to the rolls 41 and 42, which in turn feed said strip through the delivery end of said guide.

The drive of the feeding mechanism is effected as follows: The rolls 37 and 41 have connected therewith pinions 43 and 44 respectively which in turn are connected to one another through a series of idle pinions 45, while the pinion 43 is connected through pinions 46 and 47 to the above specified shaft 28 driven by the pinion 27. For a purpose hereinafter set forth the pinion 47 is loose on the shaft 28 and is provided with a connecting clutch 48. This clutch, as best illustrated in Fig. 6, is of the serrated jaw-type, one member thereof being fixed to the pinion 47 and the other to the gear 29, which, as above described, is fixed to the shaft 28. Thus, by shifting the pinion 47 axially of the shaft the clutch members may be thrown into and out of operative relation and for so shifting said pinion there is provided a lever 49 having a conventional form of connection with the hub thereof, as best illustrated in Fig. 6.

The knife for cutting the sealing strip is best illustrated in Figs. 2, 3 and 4. It comprises a vertically reciprocable blade 55 working in a guide block 56 through which the sealing strip is passed immediately upon leaving the guide plates 35 and 36. This blade is connected by a rod 57 to the plunger of a solenoid 58, the arrangement being such that when the solenoid is energized it forces said blade downwardly to sever the sealing strip. A spring 59 acts upon a member 60 connected to the solenoid plunger to raise the blade 55 when the solenoid is deenergized.

In use the traveling device is moved in a predetermined direction to sever the material on the table by the rotary cutter 7 and to displace the waste material by the plow 8. At the same time the feeding mechanism supplies the sealing strip to the rear of the cutter and plow and the pressure device 11 rides onto said strip as fed and presses the same upon the adjacent ends of the pieces of material to be united. Then, when the sealing operation is completed the solenoid 58 is energized to operate the knife blade 55 and thereby sever the sealing strip. Thereafter the traveling device is returned to initial position for another sealing operation.

It is accordingly desirable to render the feeding mechanism inoperative between the time of severing the sealing strip and the time of the next cutting and sealing operation. It is for this purpose that the aforesaid clutch 48 is provided in the feeder drive and the control of this clutch will now be described.

Referring to Figs. 5 and 6, an operative connection is provided between the clutch operating lever 49 and the plunger of the knife operating solenoid 58. This connection includes a spindle 61 having the lever 49 fixed to one end thereof and having at its other end an arm 62 suitably connected to the plunger rod 57 of the solenoid 58. The arrangement is such that when the solenoid is energized the arm 62 is rocked to rotate the spindle 61 in a counter-clockwise direction, thereby moving the lever 49 to the right to disengage the members of clutch 48. On the other hand, when the solenoid 58 is deënergized and its plunger retracted the lever 49 is moved to the left to again effect engagement of the clutch members. Thus provision is made for checking the operation of the feeding mechanism simultaneously with the severing of the sealing strip, while the following means provides for maintaining the mechanism inoperative for the desired period.

As best illustrated in Fig. 4 this latter means includes a bell crank pawl 63 suitably supported contiguous to the solenoid 58 and adapted when the solenoid is energized to engage a collar 64 on said rod to prevent retraction thereof when the solenoid is deenergized. Thus when this pawl engages said collar it holds the knife 55 in depressed position and likewise retains the clutch members of the feeder drive out of engagement. The pawl is adapted to be moved into and out of engagement with said collar automatically and to this end is connected by a link 65 to a member 66 pivotally connected to the traveling frame and carrying a roller 67 adapted to ride upon the work table. When the traveling device is in use the roller 67 engages the work table and through the link 65 retains the pawl 63 out of operative relation with the collar 64. On the other hand, when the traveling device is raised for return movement the weight of the roller 67 throws the pawl into engagement with the collar 64 as aforesaid. The pawl thus mechanically holds the parts against return movement until the device is lowered to trip said pawl.

As will hereinafter appear, the solenoid is maintained energized for a sufficient period upon elevation of the device to give the pawl ample time to move to locking position and furthermore is energized upon descent of the device to maintain the feeding mechanism inoperative until actual commencement of the next sealing operation even though the device be moved after being lowered to the table.

The roller 67 above specified is preferably arranged between the feeding mechanism and the pressure device 11 so as to roll upon the sealing strip prior to engagement of said strip by said pressure device.

The pressure device 11 is preferably electrically heated and is also preferably more or less loosely connected to the traveling device whereby its full force may be exerted upon the sealing strip. As illustrated the pressure device is connected to the frame of the traveling device by pins 68 on the former engaging in notches in the latter.

To check the traveling device after its motor is disconnected from circuit a brake 69 (Fig. 3) is preferably associated with the armature shaft of said motor. Also, this brake is preferably of the electromagnetically controlled type whereby it sets when deënergized and releases when energized.

Pivoted frame.

The frame 2, as best illustrated in Figs. 1, 5 and 8, includes two parallel bars 70 and 71 extending parallel to and disposed on opposite sides of a cutting groove in the table 1. On their upper sides these bars carry rails or tracks 72 for the aforesaid carriage and in addition the bar 71 carries a rack bar 74 heretofore referred to as being engaged by the pinions 26 and 27 on the traveling device 3. On their undersides the bars 70 and 71 are provided with clamping pads 75 (Fig. 5) preferably comprising rubber tubes to bear upon and press the work against the table.

The frame is provided at one end with a counter-weight 76 (Fig. 1) and at its opposite end with a handle 77 (Fig. 8) by which it may be raised and lowered. Also, the frame is provided with means for limiting its upward movement and means for locking the same in down position, or, in other words, in clamping relation to the table. The former means comprises two links 78 and 79 pivotally connected to the frame and to the table. These links form a toggle which is set by a spring 73, said spring being provided to assist in the elevation of the frame and to insure full upward movement thereof. The toggle must, of course, be broken in order to again lower the frame. The locking means comprises, as best illustrated in Figs. 8 and 13, a lever 80 connected by pivoted links 81 to the frame and having a cam head 82 adapted to be wedged against the underside of a lug 83 projecting from the table. The links 81 permit movement of the lever to clear the lug 83 for movement of the frame. A spring 84 tends to hold the lever in the position illustrated in Fig. 13 but permits the same to be moved downwardly to the position illustrated in dotted lines to wedge the head 82 against the lug 83 as aforesaid. This arrangement, it will be observed, enables the frame to be forcibly pressed against the table and thus firmly clamp the work thereto.

Table.

The table is provided with means which will now be described for clamping the work material thereon prior to lowering of the frame 2 and also for marginally spacing the pieces of material to admit the waste displacing plow 8 therebetween. Referring particularly to Figs. 8, 9 and 10, this means includes two clamping fingers 90 and 91 on the top of the table contiguous to its far edge. These fingers are preferably resilient and mounted on individual pivoted brackets 92 whereby they may be raised and lowered.

Referring to Fig. 8, these fingers are used in the following manner: The under piece of material is first laid on the table across the cutting groove 93 and clamped by the finger nearest said groove which, as shown, is finger 91. Then the upper piece of material is drawn across the groove and clamped by the other finger, namely finger 90. Thus, both pieces of material are marginally clamped against the table and in the proper relation to be more securely clamped upon lowering of the pivoted frame. Further, the finger 91 is disposed between the two pieces of material and thus spaces the same adjacent to its groove 93 whereby the waste displacing plow may readily enter therebetween.

The supporting brackets of the fingers 90 and 91 respectively extend through elongated recesses 94 and 95 in the table and are pivotally supported on a sliding block 96 whereby they may be adjusted longitudinally of said recesses. This provides for adjustment of said fingers for materials of different widths and is a very advantageous feature.

The supporting block 96 (Fig. 12) is mounted to slide on a plate or bar 99 carried by brackets 100 fixed to the underside of the table. It is recessed to receive said plate and is supported thereon by members 101 secured thereto and engaging the upper side of said plate. The adjustment of the block is effected by a screw shaft 102 extending through a threaded portion 103 thereof. The threaded shaft (Fig. 9) is supported in bearings 104 and 105 provided on the underside of the table and, as shown in Fig. 10, said shaft has a key extension 106 projecting from the end of the table. Thus the clamping fingers may be bodily adjusted in either direction as desired by turning the screw shaft in the appropriate direction.

The clamping fingers are biased to raised position by springs 109 connecting their respective brackets to the supporting block (Fig. 9) and are adapted to be lowered against the table by the means best illustrated in Figs. 9 and 11. The two fingers 90 and 91 are provided with individual operating levers 110 and 111 respectively and as shown in Fig. 11 said levers are fulcrumed on a common shaft 112 supported by brackets 113 and 114 fixed to the same end of the table as the other operating handles. Both levers are of the same construction and operate their respective fingers in the same manner through cable connections. Accordingly the description of one will suffice for both.

Referring to Fig. 9 and to the lever 111 shown therein, the same is provided with two rollers 115 and 116, the former being concentric therewith and the latter being carried by a bell-crank extension 117 thereof. Over these rollers passes a cable 118 secured at one end and connected at its opposite ends to the bracket 92 carrying the clamping finger 91. Thus depression of the lever 111 will through the medium of the roller 116 tension the cable and operate the bracket 92 to force the finger 91 against the table. On the other hand, when the lever is raised, the same relieves the tension on the cable, allowing the bracket 92 to return to normal position under the influence of its spring 109. The lever is preferably provided with a counterweight 119 to automatically raise the same when released. As above set forth, the lever 110 is of the same type as lever 111 and controls its respective clamping finger in the same way.

In conjunction with the levers 110 and 111 means are provided for locking the same in down position. This means includes, as best illustrated in Fig. 9, a locking pawl 120 for each lever. These pawls are fixed to a common spindle 121 and are of the same construction. Each is provided with a pivoted hooked extension 122, pressed downwardly by a spring 123 to snap over and lock with a projection 124 on its respective lever when depressed.

In practice, it is preferred to automatically release the levers when the pivoted frame is raised after each sealing operation and to this end the aforesaid means is supplemented as follows: The shaft 121 is biased by means of a spring 125 to normally hold the pawls 120 in latching position while a lever 126 is connected to said shaft to be depressed by the pivoted frame 2 when lowered and to thereby rock said shaft to lift said pawls. This, of course, tends to release the levers upon descent of the pivoted frame but means are provided to immediately relock the levers in another way. This means includes two pawls 127 fixed to the shaft 121 and arranged to be moved into the path of lugs 128 on the two levers when said shaft is rocked as just described. Thus the levers are at this time prevented from releasing the clamping fingers. However, when the levers are released and relocked as just described, they are permitted a limited upward movement equal to the distance between the extremities of the pawls 127 and lugs 128 when in alinement and during this movement their lugs 124 pass beyond the reach of the initial locking pawls 120. Thus the initial locking devices are rendered ineffective so that when the frame is again raised to release the supplemental locking pawls the levers will be freed. Accordingly, the clamping fingers are automatically released upon elevation of the frame and the locking parts are restored to their initial position.

With the aforesaid connections between the clamping fingers and their operating levers, it is desirable to provide means for adjusting said connections upon bodily adjustment of said clamping fingers. To this end, the extremities of the cables are shown as attached to drums 130 fixed to a common shaft 131. This shaft in turn is connected through worm gearing 132 to a shaft 133 operatively connected by a set of beveled gears 134 to the screw adjusting shaft of the clamping fingers. Thus, upon rotation of the adjusting shaft in either direction the drums 130 will be operated in a corresponding direction to either pay out or wind up the cables and thereby effect proper adjustment of the cables simultaneously with the bodily adjustment of the fingers. As will be apparent the worm gearing 132 inherently locks the drums 130 in their various adjusted positions.

*Current feeding means for electrical parts.*

The feeding means (Figs. 5 and 7) for the several electrical parts heretofore described includes five contact strips 140, 141, 142, 143 and 144 carried on the side of the pivoted frame 2, a contact strip 145 mounted upon the upper side of the table but insulated therefrom and a coöperating contact device movable with the aforesaid carriage. This device includes a contact carrying member 150 fixed to a suitable bracket 151 on the side of the carriage and said member carries contact brushes 140a, 141a, 143a and 144a to respectively engage the contact strips on the pivoted frame and a contact roller 145a to engage the contact strip on the table. The roller 145a is carried by a pivoted arm 154, spring-pressed toward the table and having an adjustable connection 155 with the member 150. The brushes 140a, etc., always remain in engagement with their respective contact strips while the roller 145a engages and disengages its contact strip in accordance with the position of the pivoted frame 2. Also, this roller during the sealing operation rides over the material to be united and is thereby disengaged from its contact strip. As will hereinafter appear, this roller controls the circuit of the solenoid 58 and accordingly provides for deënergization thereof while it travels over the material on the table and for energization thereof prior to passing into and upon passing off of said material. Further, the roller 145a being spring-pressed downwardly will remain in engagement with its contact strip during initial upward movement of the table frame 2 and thus maintains the solenoid energized to enable mechanical locking thereof by the pawl 63 as aforesaid.

*Automatic controller.*

This controller comprises a switch operated jointly by the traveling device and the pivoted frame 2 to control the direction of operation of said carriage and to start it under certain conditions.

This switch, as best illustrated in Fig. 15, is mounted in a casing 160 secured by brackets 161 to one of the parallel bars of the pivoted frame aforesaid. It includes (Fig. 14) stationary contacts 162, 163, 164, 165 and 166 and a coöperating revoluble contact member 167. This member carries two insulated contacts 168 and 169, each adapted to bridge certain of said stationary contacts and normally stands in the position illustrated with all of its contacts out of engagement. It is movable in opposite directions into either of two operative positions. When rotated in a clockwise direction it bridges contacts 166 and 162 by contact 168 and bridges contacts 164 and 165 by contact 169. When moved in the opposite direction, contact 168 bridges contacts 165 and 166 while contact 169 bridges contacts 163 and 164.

The operation of the switch is effected in part by the traveling device through the following means: The hub of the revoluble member 167 has fixed thereto a segmental beveled gear 170 meshing with a similar gear 171, fixed to a revoluble shaft 172 extending longitudinally of the table frame 2. Shaft 172 is mounted in suitable bearings 173 and carries radially disposed cams 174 and 175. These cams are so arranged as to be engaged by a roller 176 carried by a bracket 177 on the traveling device (Figs. 2 and 15). They are alternately engaged by said roller at the opposite limits of movement of the carriage and are so disposed with respect to said roller as to be moved in opposite directions thereby (Fig. 17). When the traveling device arrives at the limit of its forward movement, it strikes the cam 175, rotating the shaft 172 in a counter-clockwise direction, and, through the gears 171 and 170 rotating the movable contact member 167 in a clockwise direction. On the other hand, when the traveling device arrives at the limit of its return movement it strikes the cam 174, rotating the shaft 172 in a clockwise direction and hence moving the contact member 167 in a counter-clockwise direction. The movements of the switch thus effected serve to return the same to off position from both of its operative positions.

The switch is set in its operative positions by movement of the pivoted frame 2 through the medium of the following connection (Fig. 14). An arm 177 is fixed to the hub of the contact member 167 and carries at its lower end a roller 178 coöperating with a stationary cam 179. The cam is substantially diamond shaped and is carried by a bracket 180 fixed to the table 1. The roller 178 travels completely around the cam and effects operation of the limit switch as follows: In off position of the switch and the down position of the frame, the roller 178 assumes the position marked "A" This is the position in which the parts are found after a forward movement of the traveling device and operation of the switch to stop the carriage.

Thus the pivoted frame should now be raised and this operation forces the roller 178 against the upper left hand incline of the cam 179, whereby said roller and the arm 177 are forced to the left to position "B". This turns the movable contact member 167 in a clockwise direction to one of the operative positions aforesaid to establish connections for the return operation of the traveling device. The upward movement of the frame is continued after the roller reaches the position "B" and said roller being then disengaged from the cam, is moved to position "C" without further effecting the controller. Then, when the traveling device is returned to initial position and strikes the limit cam 174 the contact member 167 is moved in a counter-clockwise direction, as aforesaid, to off position, thereby advancing the arm 177 and roller 178 to the position "D".

When now the pivoted frame is again lowered for another operation, the switch is bodily raised, thereby forcing the roller 178 against the lower right hand incline of the cam 179, which incline, upon a limited downward movement of the frame, forces the roller to the position "E". This movement of the roller, and accordingly of the arm 177, moves the contact member 167 in a counter-clockwise direction to its other operative position to establish connections for forward operation of the traveling device. During the final downward movement of the frame, the roller disengages the cam 179 and passes to position "F" without further effecting the controller. Then when the device travels forward and strikes the limit cam 175, the movable contact 167 is rotated in a clockwise direction, as aforesaid, to off position and this restores the arm 177 and roller 178 to position "A".

*Control circuits.*

The control circuits are diagrammatically illustrated in Fig. 18. This figure also shows diagrammatically the motor 19, its brake 69, the solenoid 58, the electric pressure and heating device 11, the aforesaid automatic controller, and additional control switches 181 and 182, the former being a normally open push-button switch. The latter switches are shown in Fig. 8 as mounted on the table. The motor 19 is shown as provided with an armature A and a shunt field winding F. Its brake is shown as provided with an electromagnetic releasing winding 183.

With the automatic switch in off position, and with the switch 182 in open position, as illustrated, all of the electrical parts are disconnected from circuit. The switch 182, however, is intended to be normally closed and when closed connects in circuit the motor field winding F and the electric pressure device 11. The circuit of the former extends from line L by conductor 184 through one pole of switch 182, by conductors 185 and 186 to contact strip 140 and brush 140ª, by conductor 187 through the field winding F, by conductors 188 and 189 to contact brush 143ª and strip 143, by conductor 190 through switch 182, by conductor 191 to line L'. The device 11 is connected in parallel to the motor field, its circuit extending from conductor 187, aforesaid, by conductors 192 and 193 through said device, by conductors 194 and 195 to conductor 189. Thus the device 11 is heated ready for use and the motor may be started by energizing its brake coil and closing its armature circuit.

Assuming that the automatic switch is in off position with the frame 2 raised, said switch will be automatically set for forward operation of the motor by lowering of the frame. As before set forth, this operation of the frame moves the switch in a counter-clockwise direction and thus establishes the following connections: from line L, as already traced, to conductor 185 to switch contact 166, thence through segment 168 to contact 165, by conductors 196 to contact strip 142 thence through brush 141ª, by conductor 198 through the motor armature from right to left, by conductor 199 to brush 141ª and strip 141, by conductors 200 and 201 through push-button switch 181, by conductor 202 to switch contact 163 through segment 169 to contact 164, by conductor 203 to conductor 190 and thence through switch 182 to line L' as already traced. Also, circuit is established from switch contact 168 by conductor 204 to strip 144 and brush 144ª, by conductor 205 through the brake coil 183, by conductor 206 to conductor 189 and thence to line L' as already traced.

Thus by pressing the button 181 the brake 69 may be released and the motor circuit completed for forward operation of the traveling device to cut and paste the material. The push-button must, of course, be held depressed to maintain the device in operation and when released immediately stops the device. It thus provides means whereby the device may be readily stopped and restarted at will for such contingencies as the tearing of the material, etc., and moreover insures the attention of an attendant during the entire cutting and pasting operation.

The solenoid 58 is controlled by the roller 145ª and strip 145. When in contact these parts complete circuit from line L as already traced to conductor 185, thence by conductor 207 to strip 145 and brush 145ª, by conductor 208 through solenoid winding 58, by conductor 209 to conductor 195 and thence to line L' as already traced. Thus assuming that the roller and strip make contact when the frame is lowered they will energize solenoid 58 and maintain the same energized until the roller 145ª passes onto the web. When this occurs the solenoid is de-energized and the feeding mechanism operatively connected to its driving member. Then when the sealing operation is completed the roller 145ª passes off of the web and again engages strip 145. This again energizes the solenoid 58 causing it to operate the cutter to sever the sealing strip and to stop the operation of the feeding mechanism.

When the traveling device reaches its limit of forward movement it operates the automatic switch as aforesaid, returning the same to initial position. This disconnects from circuit the motor armature and the brake coil, whereby the motor is quickly brought to rest, thereby arresting the traveling device.

Assume now that the pivoted frame 2 is raised. This operates the automatic switch in a clockwise direction and thereby reverses the connections of the motor armature and closes the motor circuit. It completes circuit from line L' by conductor 185, as already traced, thence to switch contact 166 by segment 168 to contact 162, by conductors 210 and 200 to strip 141 and brush 141ª, by conductor 199 through the motor armature from left to right, by conductor 198 to brush 142ª and strip 142, by conductor 196 to switch contact 165 through segment 169 to contact 164, by conductors 203 and 190 to line L' as already traced. The traveling device is thus automatically returned to initial position and upon reaching such position restores the automatic switch to off position, as already set forth. This again disconnects the motor armature and brake coil from circuit. Should it be desired to arrest the device at any point in its return movement this may be accomplished by operation of the switch 182.

From the foregoing it will be observed that the control of the traveling device is entirely automatic save for forward operation of said device, which is manually governed through the switch 181.

What I claim as new and desire to secure by Letters Patent is:—

1. In a machine of the character set forth, a traveling device provided with a supply of sealing material, a feeding mechanism for said material operating upon movement of said device and means controlling said feeding mechanism to render its operation dependent upon the position of said device with respect to its work.

2. In a machine of the character set forth, a traveling device provided with a supply of sealing material, a feeding mechanism for said material operated upon movement of said device and means controlling said feeding mechanism to limit the operation thereof to a range of movement of said device varying with the work to be performed.

3. In a machine of the character set forth, a traveling device provided with a supply of sealing material, an automatic feeding mechanism for said material and automatic means governing said feeding mechanism to render its operation dependent upon the direction of operation and position of said device.

4. In a machine of the character set forth, a traveling device provided with a supply of sealing material, an automatic feeding mechanism therefor, and automatic means to selectively render said feeding mechanism operative and inoperative in accordance with the direction of movement and position of said device.

5. In a machine of the character set forth, a traveling device provided with a supply of sealing material, an automatic feeding mechanism therefor, said device being movable toward and away from its work and controlling means for said feeding mechanism operating upon movement of said device relative to its work as aforesaid.

6. In a machine of the character set forth, a traveling device provided with a supply of sealing material and an automatic feeding mechanism therefor, said device being movable in opposite directions and means governing said feeding mechanism to render the same inoperative during movement of said device in one direction and also during initial movement in the opposite direction until said device assumes a definite position with respect to its work.

7. In a machine of the character set forth, a traveling device provided with a supply of sealing material and an automatic feeding mechanism therefor, said device being movable in opposite directions and means governing said feeding mechanism to render the same inoperative during movement of said device in one direction and also during initial movement in the opposite direction until said device assumes a definite position with respect to its work, said means also serving to arrest operation of said feeding mechanism upon continued movement of said device to another position with respect to its work.

8. In a machine of the character set forth, a traveling device provided with a supply of sealing material, a feeding mechanism therefor, a cutter for said material and means for effecting operation of said cutter automatically upon movement of said device to a definite position with respect to its work.

9. In a machine of the character set forth, a traveling device provided with a supply of sealing material, a feeding mechanism therefor, and a cutter for said material, said cutter having associated therewith means for effecting operation thereof in any one of a plurality of positions of said device.

10. In a machine of the character set forth, a traveling device provided with a supply of sealing material, a feeding mechanism therefor, and a cutter for said material, said cutter having associated therewith means for effecting operation thereof in any one of a plurality of positions of said device and for inherently selecting such position in accordance with the work to be performed.

11. In a machine of the character set forth, a traveling device provided with a supply of material to be fed, an automatic feeding mechanism and cutter for said material and means for simultaneously operating said cutter and arresting operation of said feeding mechanism.

12. In a machine of the character set forth, a traveling device provided with a supply of material to be fed, a feeding mechanism therefor and a cutter for said material, said feeding mechanism and said cutter having an operative connection whereby the former is rendered inoperative upon operation of the latter.

13. In a machine of the character set forth, a traveling device provided with a supply of material to be fed, and an electromagnetically controlled feeding mechanism to be actuated by movement of said device.

14. In a machine of the character set forth, a traveling device provided with a supply of material to be fed, a feeding mechanism for said material, a cutter for said material and electro-responsive means controlling the operation of said feeding mechanism and said cutter.

15. In a machine of the character set forth, a traveling device provided with a supply of material to be fed, a feeding mechanism operating upon movement of said device, electro-responsive means to render said feeding mechanism inoperative and mechanical means to maintain said feeding mechanism inoperative, said means being effective only when said device is out of operative relation with respect to its work.

16. In a machine of the character set forth, in combination, a traveling pasting device provided with a supply of pasting strip, an electromagnetically controlled feeding mechanism for said strip and an automatic circuit controller for said feeding mechanism utilizing the material to be united for timing its action.

17. In a machine of the character set forth, in combination, a traveling device provided with a supply of sealing material, an electromagnetically controlled cutter for such material and an automatic controller for said cutter utilizing the material to be sealed for timing the operation of said cutter.

18. In a machine of the character set forth, a traveling device, an electro-responsive winding thereon for actuating a part thereof and a controller for said winding including a stationary contact strip and a coöperating contact movable with said device, said contacts to receive therebetween the material acted upon by said device.

19. In a machine of the character set forth, the combination, with a traveling device carrying a supply of sealing material and a feeding mechanism and cutter for said material, of automatic means timed in its action by the material acted upon to effect operation of said cutter and cessation of operation of said feeding mechanism.

20. In a machine of the character set forth, the combination with a traveling device carrying a supply of sealing material and an automatic feeding mechanism, of means for rendering said feeding mechanism operative and inoperative including means timed in its action by engaging and disengaging the material acted upon by said device.

21. In a device for uniting material of the character set forth, in combination, a table for supporting the pieces of material to be united in an overlapped relation, a marginal clamping member bearing upon the upper piece and leaving a limited end portion thereof unsecured and a second marginal clamping member bearing upon the lower piece and interposed between the same and the unsecured end portion of the upper piece.

22. In a device of the character set forth, a work table, a plurality of work clamping members mounted on said table, individual operating means for said members and means to bodily adjust said members together on said table.

23. In a device of the character set forth, in combination, a work supporting table and a clamping member for the work bodily adjustable on said table, an operating member for said clamping member and an adjustable connection between said members compensating for the bodily adjustment of said clamping member.

24. In a device of the character set forth, a work supporting table, a member thereon for marginally clamping the work thereto, an operating handle for said member, an adjustable connection between said member and said handle and means for adjusting the position of said member on said table and simultaneously adjusting said connection.

25. In a device of the character set forth, a work supporting table, a plurality of work clamping fingers, individual operating members for said fingers, an adjustable connection between each of said fingers and its operating member and means for bodily adjusting said clamping fingers and simultaneously adjusting the connections between the same and their respective operating members.

26. In a device of the class described, a work table, a work clamping device thereon, means for setting and locking said clamping device, a second work clamping device adapted to be raised and lowered with respect to said table, said second device when moved away from said table effecting release of said first mentioned device.

27. In a machine of the character set forth, in combination, a table, a work clamping frame movable toward and away from said table, a work clamping member having means for setting and locking the same when said frame is in raised position, said frame when subsequently lowered and raised effecting release of said second clamping member.

28. In a device of the character set forth, in combination, a work clamping member having means for setting and locking the same, a second work clamping member adapted, when set, to release and re-lock said first mentioned member and when released to also release said first mentioned member.

29. In a machine of the character set forth, a work table, a work clamping member having means for setting and locking the same, a second clamping member having means adapted upon setting thereof to release and re-lock said first mentioned member, said re-locking means being effective only while said second member remains set.

30. In a machine of the character set forth, in combination, a work support, a member extending across same to be raised and lowered with respect thereto, an automatically propelled device mounted for travel upon said member and direction controlling means for said device governed by movement of said member.

31. In a machine of the character set forth, in combination, a work table, a member extending across said table and movable toward and away from the same, an automatically propelled device mounted for movement on said member and means operated by said member, when raised from said table, to start said device.

32. In a machine of the character set forth, in combination, a work table, an automatically propelled device movable across said table, a supporting frame for said device movable toward and away from said table, and means governed by the movement of said frame to determine the direction of operation of said device and to start said device.

33. In a machine of the character set forth, in combination, a work table, an automatically propelled device mounted for movement thereon, a frame supporting said device and movable with respect to said table and controlling means for said device operated thereby to automatically arrest the same at its limits of movement and operated by movement of said frame to selectively vary the direction of operation of said device.

34. In a machine of the character set forth, in combination, a work table, an automatically propelled device movable thereover, a frame supporting said device and movable with respect to said support and controlling means for said device operated thereby to arrest the same at its limits of movement, said controlling means being also operable by said frame to vary the direction of movement of said device and to automatically start said device in one direction.

35. In a machine of the character set forth, in combination, an adjustable support, an automatically propelled device movable thereon and a reversing controller for said device operated by adjustment of said support.

36. In a machine of the character set forth, in combination, an adjustable support, an automatically propelled device movable thereon and a controller operated by adjustment of said support to determine the direction of operation of said device and to start the same in one direction.

37. In a machine of the character set forth, in combination, an adjustable support, an automatically propelled device movable thereon and a controller operated by adjustment of said support to determine the direction of operation of said device and to start the same in one direction, said device also operating said controller to arrest itself at predetermined limits.

In witness whereof, I have hereunto subscribed my name in the presence of two witnesses.

GUSTAVE B. REISBACH.

Witnesses:
TEKLA BAST,
L. A. WATSON.